Aug. 4, 1959 L. W. ERATH 2,898,553
BRIDGE-STABILIZED OSCILLATOR
Filed Aug. 27, 1957
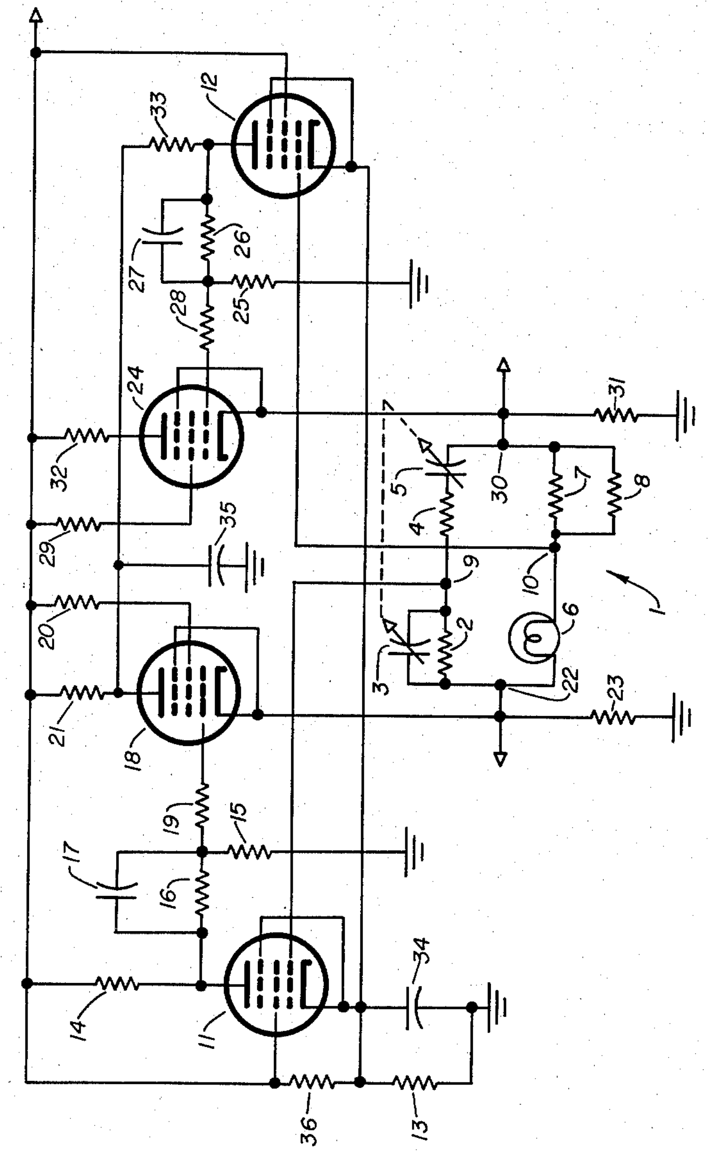
Louis W. Erath,
INVENTOR.
By
Burns, Doane, Benedict & Irons
ATTORNEYS United States Patent Office 2,898,553

Patented Aug. 4, 1959

2,898,553

BRIDGE-STABILIZED OSCILLATOR

Louis W. Erath, Houston, Tex., assignor, by mesne assignments, to Dresser Industries, Inc., Dallas, Tex., a corporation of Delaware Application August 27, 1957, Serial No. 680,468

5 Claims. (Cl. 331—46)

This invention relates to oscillators and more particularly to vacuum tube bridge-stabilized oscillators.

Bridge-stabilized electronic oscillators are known to be among the most stable and among those subject to the lowest distortion. It is further known that a Wien bridge R-C oscillator is particularly advantageous for variable frequency operation. I have developed a two amplifier Wien bridge-stabilized oscillator described in "Electronics," October 1953, pages 174–175, which oscillator is extremely stable in operation, has constant amplitude with varying frequency, and has a low distortion characteristic. The present invention represents an improvement over that circuit designed to lower the distortion even further so that a sine wave output of constant amplitude and near perfect wave form can be obtained over a wide range of frequencies.

The principal improvement of the present invention is obtained by avoiding the wide swing in plate characteristics of one of the amplifier circuits, so that distortion caused by the non-linearity of the amplifier tube may be minimized. The characteristics of the amplifier are also improved by bypassing the cathode bias resistor of the input tubes of the amplifier, for signal voltages.

The invention will now be more fully described in conjunction with a preferred embodiment thereof as shown in the accompanying drawing.

The single figure of the drawing is a schematic diagram of an oscillator constructed in accordance with the invention.

The Wien bridge oscillator of my aforementioned publication includes a Wien bridge 1 which has a pair of R-C legs defined by the shunt combination of a resistor 2 and a capacitor 3 and the series combination of a resistor 4 and a capacitor 5. The bridge also includes resistance legs formed by a temperature sensitive element such as electric lamp 6, and the shunt combination of resistor 7 and padder resistor 8. The resistor 6 is used because of its thermal non-linearity, so that the changing resistance thereof compensates for changes in temperature of the bridge. The resistor 7 which feeds lamp 6 is preferably of deposited carbon, which, because of its lower voltage coefficient, reduces distortion of the output signal.

The output of the bridge is developed across terminals 9 and 10, and these terminals are respectively connected to the control grids of pentode vacuum tubes 11 and 12. Cathode bias for tubes 11 and 12, the input stages of the two amplifiers, is obtained through a resistor 13 common to the cathode circuits of the two tubes and connected between the cathodes and ground, together with a voltage divider including resistor 13 and resistor 36 connected between a source of positive potential and ground. The screen grids of both of tubes 11 and 12 are connected to the source of positive potential, and the suppressor grids are connected to the cathodes of the tubes. The plate of tube 11 is connected through a plate resistor 14 to the source of positive potential and is connected through the series combination of resistor 15 with the shunt combination of resistor 16 and capacitor 17 to ground. This network provides for direct resistance, as well as capacitance, coupling to the input circuit of pentode amplifier 18, since the grid thereof is connected through a resistor 19 to the junction between the R-C combination 16 and 17 and resistor 15.

The screen grid of pentode 18 is connected through a resistor 20 to the source of positive potential, while the suppressor grid is connected to cathode. The plate of the tube 18 is connected to the source of positive potential through a resistor 21.

Amplifier tube 18 is cathode-coupled to terminal 22 of the Wien bridge, with the cathode connected directly to that terminal and the terminal connected to ground through output resistor 23.

The plate of amplifier tube 12 is coupled to the grid of a pentode amplifier 24 in the same fashion that amplifier 11 is coupled to cathode follower 18. That is, the plate of pentode 12 is connected to ground through the series combination of resistor 25 with the shunt combination of resistor 26 and capacitor 27. The junction between resistor 25 and the shunt combination is connected through a resistor 28 to the control grid of pentode 24. The screen grid of the pentode 24 is connected to the source of positive potential through a dropping resistor 29, while the suppressor grid is connected to cathode.

Output amplifier tube 24 is also operated as a cathode follower, like output amplifier 18, with its cathode connected directly to input terminal 30 of the Wien bridge and connected to ground through cathode resistor 31. The plate of cathode follower 24 is connected to the source of positive potential through a plate resistor 32.

The apparatus so far described is substantially identical with the apparatus described in the aforementioned publication. As is well known from the theory of Wien bridge oscillators, this apparatus operates so as to be degenerative with respect to all frequencies but the particular frequency at which the bridge is balanced. That frequency is selected by control of the capacities of capacitors 3 and 5, which are preferably variable and ganged together so as to allow selection of the output frequency of the oscillator over a wide range. The particular oscillator disclosed is designed for variation over a frequency range of one cycle per second to 120 kilocycles per second.

Though the above-described oscillator functions satisfactorily, it does have a level of distortion which is disadvantageous for many applications. I have found that the distortion can be reduced by a factor of two or three, by insuring that the plate current swing of the amplifier subject to the greatest plate current swing is as low as possible. In the present embodiment of the invention, this is achieved by returning the plate of pentode 12, the input of the right-hand amplifier, to the plate of cathode follower 18, the output tube of the left-hand amplifier. The connection is made through a resistor 33.

If the plate of pentode 12 were connected to the high voltage source, rather than to the plate of cathode follower 18, the plate current swing of amplifier 12 would be of the order of twice the corresponding swing of input amplifier 11. This is because of the higher impedance of the right-hand legs of the Wien bridge than the left-hand legs. This greater range of plate current swing results in substantial distortion of the signal because of the non-linearity of the plate current-grid voltage characteristics of the amplifier tube. If the swing of amplifier 12 could be of the order of that found in amplifier 11, the distortion would be substantially reduced by reason of the fact that the swing would take place over a smaller range of the tube characteristics.

The reduction of the swing of the plate current in input amplifier 12 is accomplished by connecting in series with its plate a voltage which varies in phase with its plate voltage. This voltage is of course obtained from the plate of amplifier 18. Stated differently, the plate voltage source for amplifier 12 is lower than the positive B source by an amount equal to the plate voltage drop of amplifier 18.

The reason that the phase of the anode voltage of tube 18 is the same as the phase of the anode voltage of tube 12 will now be explained. A characteristic of Wien bridges is that the terminals 9 and 10 are of opposite polarity or phase. Assume that the grid of tube 12, connected to terminal 10, is going positive, and the grid of tube 11 is going negative. The anode of tube 12 will therefore go negative, because of the 180° phase reversal caused by the tube. The anode of tube 11 will likewise go positive for the same reason, thereby making the grid of tube 18 go positive. The anode of tube 18, being 180° out of phase with its grid, will go negative, the same phase as the anode of tube 12. Therefore, the phases of the anodes of tubes 12 and 18 are the same, so that the anode voltage for tube 12 can be obtained from the anode of tube 18.

As indicated above, this feature enables me to obtain a distortion which is lower by a factor of two or three than the distortion obtained with my prior oscillator.

A second feature contributing to the reduction in distortion of the oscillator of the present invention is the use of a high capacity bypass across the common cathode resistor 13 of input amplifiers 11 and 12, provided by capacitor 34. This bypass apparently increases the gain of the amplifiers so as to make the degenerative feedback more effective, thereby to reduce the distortion.

I have found also that parasitic oscillations may be reduced by connecting the plate of cathode follower 18 to ground through a very small bypass capacitor 35, which forms a low impedance path for high frequency parasitics. This bypass further reduces the distortion in the output of the oscillator.

As indicated in the drawing, an output voltage may be taken from across cathode resistor 23 or from across cathode resistor 31. The voltage from the former resistor will be about one-half the amplitude of that across the latter resistor.

It will be evident that many minor changes could be made in the apparatus above described without departure from the scope of the invention. Therefore the invention is not to be considered limited to the illustrative embodiment specifically described, but rather only by the scope of the appended claims.

I claim:

1. An oscillator comprising a Wien bridge and a pair of two tube vacuum tube amplifiers, the grid of the input tube of one amplifier being connected to one output terminal of the bridge between the resistance legs and the grid of the input tube of the other amplifier being connected to the other output terminal of the bridge between the two R-C legs, the plates of the input tubes of the amplifiers being R-C coupled to the grids of the output tubes thereof, the cathodes of the output tubes of the amplifiers being connected to different input terminals of the bridge and through first and second resistors, respectively, to a point of common potential, third and fourth resistors, the plate of the output tube of said other amplifier being connected through said third resistor to a point of fixed anode potential, and the plate of the input tube of said one amplifier being connected through said fourth resistor to the junction between the plate of the output tube of said other amplifier and said third resistor.

2. The apparatus of claim 1 including a fifth resistor, the cathodes of the input tubes of both amplifiers being connected to said point of fixed potential through said fifth resistor, and a capacitor connected across said fifth resistor to act as an A.-C. bypass.

3. The apparatus of claim 2 including a very small capacitor connected between the plate of the output tube of said other amplifier and said point of fixed potential to suppress parasitic oscillations.

4. An oscillator comprising a Wien bridge including a pair of frequency-sensitive legs and a pair of resistance legs having four terminals, with the frequency-sensitive legs connected between the first and second and second and third terminals, respectively, and with the resistance legs connected between the third and fourth and fourth and first terminals, respectively, a first and a second 180° phase shift vacuum tube amplifier, the first amplifier having its input connected to the fourth terminal and its output connected to the third terminal, the second amplifier having its input connected to the second terminal and its output connected to the first terminal, the input of the first amplifier being subjected to a larger dynamic voltage change than the input of the second amplifier, and means connected to said first amplifier operable to reduce the dynamic current change in said first amplifier to the order of the dynamic current change in said second amplifier, in order to equalize the dynamic characteristics of said amplifiers.

5. The apparatus of claim 4 including an anode voltage source and in which each of said amplifiers has a pair of cascade-connected tubes, the output tubes of the first and second amplifiers being cathode-coupled to said third and first terminals, respectively, the anodes of at least the input and output tubes of the second amplifier being resistance-coupled to said voltage source, and in which said last-named means includes a resistance connection between the anode of the input tube of the first amplifier and the anode of the output tube of the second amplifier.

References Cited in the file of this patent

Bridge-Stabilized Ultrasonic Oscillator, by Erath in Electronics, October 1953.